(12) United States Patent
Azizi et al.

(10) Patent No.: US 10,659,206 B2
(45) Date of Patent: May 19, 2020

(54) TECHNIQUES TO COMMUNICATE INFORMATION USING OFDMA TONE ALLOCATION SCHEMES IN FREQUENCY BANDS

(71) Applicant: Intel IP Corporation, Santa Clara, CA (US)

(72) Inventors: Shahrnaz Azizi, Cupertino, CA (US); Thomas J. Kenney, Portland, OR (US); Eldad Perahia, Portland, OR (US); Robert Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/905,218

(22) Filed: Feb. 26, 2018

(65) Prior Publication Data

US 2018/0287758 A1 Oct. 4, 2018

Related U.S. Application Data

(63) Continuation of application No. 14/751,509, filed on Jun. 26, 2015, now Pat. No. 9,906,343.

(60) Provisional application No. 62/109,464, filed on Jan. 29, 2015.

(51) Int. Cl.
*H04L 5/00* (2006.01)
*H04L 1/00* (2006.01)
*H04L 27/00* (2006.01)
*H04L 27/36* (2006.01)
*H04L 27/20* (2006.01)

(52) U.S. Cl.
CPC .............. *H04L 5/0048* (2013.01); *H04L 1/00* (2013.01); *H04L 5/0007* (2013.01); *H04L 5/0044* (2013.01); *H04L 27/0008* (2013.01); *H04L 27/362* (2013.01); *H04L 1/0059* (2013.01); *H04L 5/0023* (2013.01); *H04L 27/2035* (2013.01)

(58) Field of Classification Search
None
See application file for complete search history.

(56) References Cited

U.S. PATENT DOCUMENTS

2006/0002361 A1* 1/2006 Webster ............... H04B 7/0697 370/343
2006/0018249 A1* 1/2006 Shearer ............... H04L 27/2602 370/208
2009/0274039 A1* 11/2009 Yamagishi .......... H04L 27/2647 370/210

* cited by examiner

*Primary Examiner* — Anh Ngoc M Nguyen

(57) ABSTRACT

Various embodiments are generally directed to an apparatus, method and other techniques to determine a bandwidth in a frequency band to communicate information to stations, determine an Orthogonal Frequency-Division Multiple Access (OFDMA) tone allocation scheme based on the bandwidth, the OFDMA tone allocation scheme to include one or more resource units each comprising a plurality of tones and each having a fixed location in the bandwidth, and communicate information to the stations based on the OFDMA tone allocation scheme.

31 Claims, 9 Drawing Sheets

500

DETERMINE A BANDWIDTH IN A FREQUENCY BAND TO COMMUNICATE INFORMATION TO STATIONS
505

DETERMINE AN ORTHOGONAL FREQUENCY-DIVISION MULTIPLE ACCESS (OFDMA) TONE ALLOCATION SCHEME BASED ON THE BANDWIDTH, THE OFDMA TONE ALLOCATION SCHEME TO INCLUDE ONE OR MORE RESOURCE UNITS EACH COMPRISING A PLURALITY OF TONES AND EACH HAVING A FIXED LOCATION IN THE BANDWIDTH
510

COMMUNICATE INFORMATION TO THE STATIONS BASED ON THE OFDMA TONE ALLOCATION SCHEME
515

*FIG. 5*

TECHNIQUES TO COMMUNICATE INFORMATION USING OFDMA TONE ALLOCATION SCHEMES IN FREQUENCY BANDS

CROSS REFERENCE OF RELATED APPLICATION

This application is a continuation of, claims the benefit of and priority to previously filed U.S. patent application Ser. No. 14/751,509 filed Jun. 26, 2015, entitled "TECHNIQUES TO COMMUNICATE INFORMATION USING OFDMA TONE ALLOCATION SCHEMES IN FREQUENCY BANDS", which claims priority to U.S. Provisional Patent Application Ser. No. 62/109,464 entitled "High-Efficiency (HE) Wi-Fi Station and Method for OFDMA Tone Planning That Uniformly Supports 256QAM Rate 5/6" filed on Jan. 29, 2015; both of which are incorporated herein by reference in their entirety.

TECHNICAL FIELD

Embodiments pertain to wireless networks. Embodiments described herein generally relate techniques to communicate using an Orthogonal Frequency-Division Multiple Access (OFDMA) tone allocation scheme in frequency bands.

BACKGROUND

Wireless communications has been evolving toward ever increasing data rates, e.g., from IEEE 802.11a/g to IEEE 802.11n to IEEE 802.11ac. In high-density deployment situations, overall system efficiency may become more important than higher data rates. For example, in high-density hotspot and cellular offloading scenarios, many devices competing for the wireless medium may have low to moderate data rate requirements with respect to the very high data rates of IEEE 802.11ac. A recently-formed study group for Wi-Fi evolution referred to as the IEEE 802.11 High Efficiency WLAN (HEW) study group (SG) (i.e., IEEE 802.11ax) is addressing these high-density deployment scenarios.

BRIEF DESCRIPTION OF THE DRAWINGS

FIG. 5 illustrates an example embodiment of a logic flow diagram.

DETAILED DESCRIPTION

Figure 1:
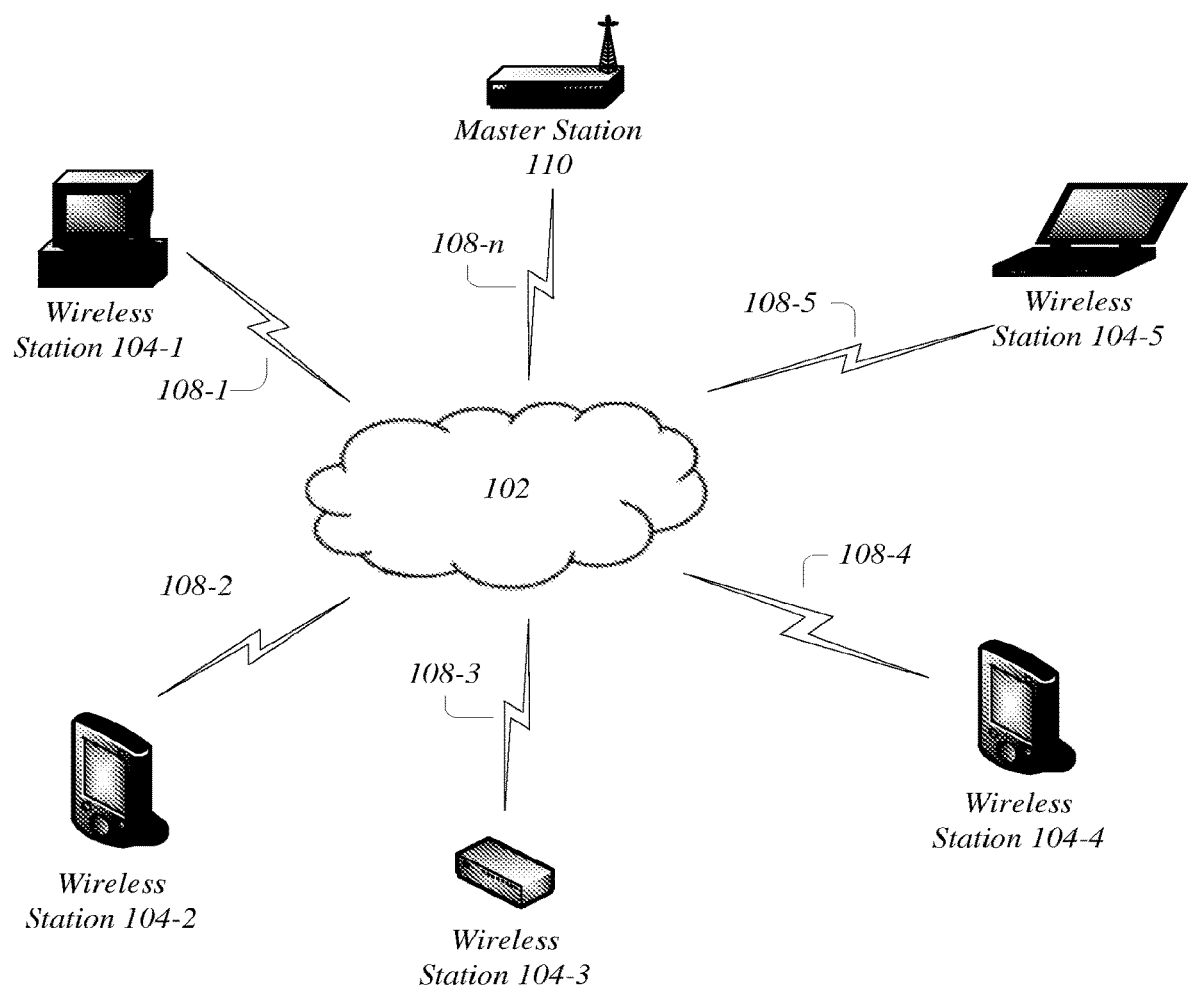
FIG. 1 illustrates an example embodiment of a computing system.

Various embodiments are generally directed to techniques for operation in accordance with one or more specification, standards or variants suitable for wireless communications. For example, various embodiments may be directed to one or more systems operating in or around the 2.4 GHz and 5 GHz frequency bands in accordance any one the of following IEEE 802.11 standards, such as IEEE 802.11a, 802.11b, 802.11g, 802.11n, 802.11ac, 802.11ax and other derivatives of these standards. For example, some embodiments may be directed one or more systems or devices operating according to Institute of Electrical and Electronics Engineers (IEEE) Standard 802.11ac-2013, Amendment 4: Enhancements for Very High Throughput for Operation in Bands below 6 GHz, published December 2013, or according to any predecessors, revisions, or variants thereof, such as 802.11ax also known as high efficiency WLAN (HEW) promulgated by the High Efficiency WLAN Study Group (HEW SG). These IEEE 802.11 standards, including IEEE 802.11a, 802.11b, 802.11g, 802.11n, 802.11ac, and 802.11ax may be collectively referred to as the "IEEE 802.11 standards."

The following disclosure discusses OFDMA tone allocation schemes for multi-user operation in IEEE 802.11ax (High Efficiency WLAN or HEW). The waveform operates with a 4× longer symbol duration than existing 802.11 OFDM waveforms (VHT, HT or non-HT) as defined in the existing 802.11 specification. Further, embodiments provide a flexible tone resource unit allocation method that is simple for implementation, testing, scheduling and sub-band feedback. The proposed OFDMA tone allocations have fixed locations, while supporting pilot tones with variable locations. In addition, the proposed allocation sizes provide a significant advantage over predecessor schemes by supporting a 256-QAM modulation coding scheme (MCS), coding rate 5/6, with BCC encoding on all OFDMA allocation sizes.

In embodiments, stations (e.g., master stations and wireless stations) may be configured to communicate using one or more of the allocation sizes disclosed herein for 256-QAM, coding rate 5/6, with BCC encoding. The embodiments disclosed herein provide details on the number of subcarriers or tones assigned in various possible resource blocks that are arrived at after considering a number of trade-offs including frequency efficiency, reuse of existing 802.11 Wi-Fi architectural building blocks, ease of implementation and coexistence with legacy devices, although the scope of the embodiments is not limited in this respect.

The 802.11ax task group has been started to evolve Wi-Fi from the 802.11ac/ah proposed standards. This task group considers, as one of the target use cases, high density deployment scenarios such as large enterprises, residential buildings and hotspots for which OFDMA is a promising technology. However, embodiments described herein are not limited to these usage scenarios may be implemented any other contemplated scenario.

The embodiments disclosed herein provide detailed design, i.e., various OFDMA allocation sizes for the 256-point, 512-point and 1024-point Fast Fourier Transforms (FFTs) in 802.11ax 20 MHz, 40 MHz and 80 MHz bandwidths of operation, respectively. They may be used with a 4× symbol duration of 802.11n/ac, to target both outdoor and indoor environments. In outdoor environments, 4× longer symbol duration enables the use of a more efficient Cyclic Prefix (CP) to overcome the longer delay spread, and in indoor environment, it allows a more relaxed requirement for clock timing accuracy.

Some of the embodiments disclosed herein may use multiple of powers of two of 26-tone, and 242-tone allocations, in addition to a 108-tone allocation. These embodiments may allow more guard tones and nulls at direct conversion (DC) for 80 MHz operation vs. 20 and 40 MHz operation to further ease implementation in the 5 GHz band, while providing consistent structure for the 2.4 GHz and 5 GHz bands. Some of the embodiments disclosed herein may minimize the number of configurations and OFDMA modes. This may be done by designing allocations with fixed locations.

Some of the embodiments disclosed herein provide 20 MHz, 40 MHz and 80 MHz waveform designs for use in 20 MHz, 40 MHZ and 80 MHz BSSs. The proposed waveform is easily scaled for use in a BSS with 160 MHz with either contiguous or non-contiguous allocations. The proposed design has characteristics, such as efficient support of 256-QAM, coding rate 5/6, with BCC encoding and use of existing interleaver architecture, consistent tone use for 2.4 GHz and 5 GHz frequency bands, consistent tone use for 20 MHz and 40 MHz and easy feedback and consistent with 80 MHz bandwidth. Other characteristics of embodiments may include simple implementation, testing, scheduling and sub-band feedback, limited number of modes, resource unit allocations have fixed locations and only in some instances only one 26-tone resource unit straddles DC tones.

Reference is now made to the drawings, wherein like reference numerals are used to refer to like elements throughout. In the following description, for purposes of explanation, numerous specific details are set forth in order to provide a thorough understanding thereof. It may be evident, however, that the embodiments can be practiced without these specific details. In other instances, structures and devices are shown in block diagram form in order to facilitate a description thereof. The intention is to cover all modifications, equivalents, and alternatives consistent with the claimed subject matter.

FIG. 1 illustrates a block diagram of one embodiment of a communications system 100. In various embodiments, the communications system 100 may include multiple stations or devices. A station generally may include any physical or logical entity for communicating information in the communications system 100 and may be implemented as hardware, software, or any combination thereof, as desired for a given set of design parameters and performance constraints. Although FIG. 1 may show a limited number of stations by way of example, it can be appreciated that more or less stations may be employed for a given implementation.

In various embodiments, the communications system 100 may include, or form part of a wired communications system, a wireless communications system, or a combination of both. For example, the communications system 100 may include one or more stations arranged to communicate information over one or more types of wired communication links. Examples of a wired communication link, may include, without limitation, a wire, cable, bus, printed circuit board (PCB), Ethernet connection, peer-to-peer (PTP) connection, backplane, switch fabric, semiconductor material, twisted-pair wire, co-axial cable, fiber optic connection, and so forth. The communications system 100 also may include one or more stations arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands. The communications system 100 may communicate information in accordance with one or more standards as promulgated by a standards organization, such as the IEEE 802.11 standards previously discussed.

The communications system 100 may communicate, manage, or process information in accordance with one or more protocols. A protocol may include a set of predefined rules or instructions for managing communication among stations. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. The embodiments are not limited in this context.

As shown in FIG. 1, the communications system 100 may include a network 102 and a plurality of wireless stations 104-n, where n may represent any positive integer value. In various embodiments, the wireless stations 104-n may be implemented as various types of wireless devices. Examples of wireless devices may include, without limitation, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, media server, digital music player, set-top box (STB), appliance, workstation, user terminal, mobile unit, consumer electronics, television, digital television, high-definition television, television receiver, high-definition television receiver, and so forth. In the illustrated embodiment shown in FIG. 1, the wireless stations 104-n may include a PC 104-1, a digital TV 104-2, a media source 104-3 (e.g., a CD, DVD, media file server, etc.), a handheld device 104-4, and a laptop or notebook 104-5. These are merely a few examples, and the embodiments are not limited in this context.

In some embodiments, the wireless stations 104-n may include one more wireless interfaces and/or components for wireless communication such as one or more transmitters, receivers, transceivers, chipsets, amplifiers, filters, control logic, network interface cards (NICs), antennas, antenna arrays, modules and so forth. Examples of an antenna may include, without limitation, an internal antenna, an omni-directional antenna, a monopole antenna, a dipole antenna, an end fed antenna, a circularly polarized antenna, a microstrip antenna, a diversity antenna, a dual antenna, an antenna array, and so forth.

In some embodiments, the wireless network 102 may be a High Efficiency (HE) Wi-Fi (HEW) network. The wireless network 102 may include a master station 110, and the wireless stations 104-n may be HEW stations. In some embodiments, the wireless network 102 may support communication by legacy stations (not shown). The master station 110 may be arranged to communicate with the HEW stations 104 and the legacy stations in accordance with one or more of the IEEE 802.11 standards.

In accordance with some embodiments, an access point may operate as the master station 110 and may be arranged to contend for a wireless medium (e.g., during a contention period) to receive exclusive control of the medium for a HEW control period, e.g., a transmission opportunity (TXOP). The master station 110 may, for example, transmit a master-sync or control transmission at the beginning of the HEW control period to indicate, among other things, which wireless stations 104 are scheduled for communication during the HEW control period. During the HEW control period, the scheduled wireless stations 104 may communicate with the master station 110 in accordance with a non-contention based multiple access technique. This is unlike conventional Wi-Fi communications in which devices communicate in accordance with a contention-based communication technique, rather than a non-contention based multiple access technique. During the HEW control period, the master station 110 may communicate with wireless stations 104 using one or more HEW frames. During the HEW control period, legacy stations may refrain from communicating. In some embodiments, the master-sync transmission may be referred to as a control and schedule transmission.

In some embodiments, the master station 110, the one or more stations 104, and the wireless network 102 may support and use one or more modulation schemes to communicate information between the stations. For example, embodiments may include stations communicating using the Orthogonal Frequency-Division Multiplexing (OFDM) digital modulation scheme and/or the multi-user version orthogonal frequency-division multiple access (OFDMA). Multiple access may be achieved by assigning subsets of subcarriers or tones to individual users or stations to allow for simultaneous transmissions between stations. To incorporate OFDMA into WLAN capable stations, various parameters and designs may be made to the physical layer (PHY) and embodiments may include using one or more OFDMA tone allocation schemes to assign a subset of tones to stations in bandwidths in a frequency band. In addition, the OFDMA tone allocation schemes may take into account a number of trade-offs, such as frequency efficiency, reuse of existing 802.11 Wi-Fi architectural designs, ease of implementation, and coexistence with legacy communication methods.

In some embodiments, one or more of the master station 110 and the wireless stations 104-n may include memory having instructions that may be processed by logic, circuitry, and/or a processor component to determine a bandwidth in a frequency band to communicate information to one or more other stations. The frequency band may be the 2.4 GHz or 5 GHz frequency and the bandwidth may be based on a number of stations wanting to communicate at a same or similar time period. In some embodiments, the bandwidth may be 20 megahertz (MHz), 40 MHz, or 80 MHz contiguous bandwidths or an 80+80 MHz (160) MHz non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In some embodiments, one or more of the master station 110 and the wireless stations 104 may also include memory having instructions that may be processed by logic, circuitry, and/or a processor component to determine an OFDMA tone allocation scheme based on a determined bandwidth. The OFDMA tone allocation scheme may include one or more tone resource unit allocations that include resource units. Each of the resource units of a tone resource unit allocation may be assigned to a user and may include a plurality of tones. Further, each of the resource units may have an OFDMA tone allocation size which may be a multiple powers of two for a 26-tone resource unit, and a 242-tone resource unit. In other words, a resource unit may have a 26-tone size, a 52-tone size, a 242-tone size, or a 2×242 (484)-tone size. In some embodiments, the OFDMA tone allocation size for a resource unit may be a 108-tone size or a 996-tone size. The OFDMA tone allocation size may allow for operations using 256-point, 512-point, and 1024-point FFTs in the 20 MHz, 40 MHz, and 80 MHz, respectively. Further, these FFTs may be used with a symbol duration that is 4 times (4×) longer than a typical symbol duration used in 802.11ac, for example. This longer symbol duration may allow for a more efficient cyclic prefix (CP) to overcome a longer delay spread and allow for a more relaxed clock timing accuracy.

In some embodiments, an OFDMA tone allocation scheme may define a number of resource units having tones where each of the resource units may have a fixed location within the bandwidth of a frequency range. Further, embodiments may include an OFDMA tone allocation scheme that supports a number of guard, null, and pilot tones, where the pilot tones have a variable location in the bandwidth. An OFDMA tone allocation scheme discussed herein may allow for more guard tones and nulls around direct conversion (DC) tones for 80 MHz operation versus 20 MHz operation and 40 MHz operation.

In some embodiments, the OFDMA tone allocation schemes may support communicating information between stations having a number of characteristics. For example, the OFDMA tone allocation schemes discussed herein may support communicating information in accordance with a modulation and coding scheme, such as BPSK, QPSK, 16-QAM, 64-QAM, and 256-QAM. Further, the OFDMA tone allocation schemes discussed herein may support a forward error correction (FEC) coding rate, such as a 1/2 coding rate, a 2/3 coding rate, a 3/4 coding rate, and a 5/6 coding rate. In some embodiments, the OFDMA tone allocation schemes discussed herein may support binary convolutional coding (BCC). For example, embodiments may include features to support an OFDMA tone allocation scheme for 20 MHz bandwidth that is capable of communicating information using a 256-QAM modulation scheme, a 5/6 coding rate, and BCC encoding, which is not supported in IEEE 802.11ac, for example. Various embodiments are not limited in this manner. These and other details will become more apparent in the following description.

Figure 2:
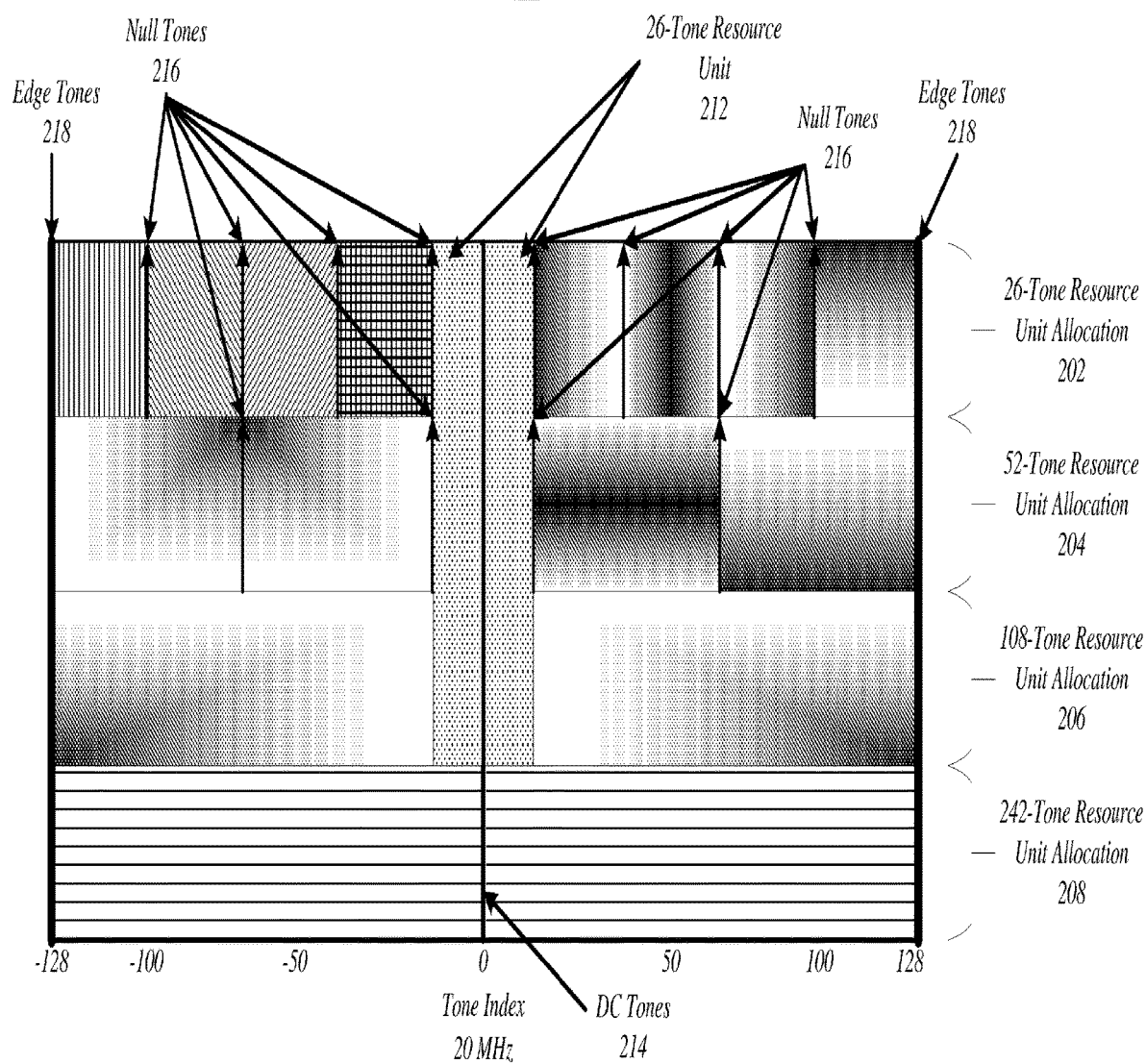
FIG. 2 illustrates an example embodiment of an OFDMA tone allocation scheme.

FIG. 2 illustrates an example embodiment of an OFDMA tone allocation scheme 200 which may be used in communicating information between stations, such as master station 110 and wireless stations 104. In the illustrated embodiment, the OFDMA tone allocation scheme 200 has a bandwidth of 20 MHz which may be in the 2.4 GHz or the 5 GHz frequency band. In embodiments, the OFDMA tone allocation scheme 200 may illustrate 256 tones from −128 on the left side of the DC tones 214 to 128 on the right side of DC. In other words, the FFT size for a 20 MHz bandwidth OFDMA tone allocation scheme may be 256, which may include 3 DC tones 214, 11 edge or guard tones 316, and 242 usable tones which includes a number of pilot tones. The OFDMA tone allocation scheme for a 20 MHz bandwidth may also include a number of null tones 216, such as eight null tones in the 26-tone resource unit allocation 202 and four null tones in the 52-tone resource unit allocation 204. Embodiments are not limited in this manner.

The OFDMA tone allocation scheme 200 may divide the 20 MHz bandwidth into a number of resource units each having a plurality of tones. The number of resource units and the OFDMA tone allocation size may be based on a number of stations to communicate in the network. More specifically, the OFDMA tone allocation scheme 200 in the 20

MHz frequency range may allocate tones in a 26-tone resource unit allocation 202, a 52-tone resource unit allocation 204, a 108-tone resource unit allocation 206, and a 242-tone resource unit allocation 208. Further, the OFDMA tone allocation scheme 200 includes a single 26-tone resource unit 212 that may straddle the DC tones 214 and may be within the 26-tone resource unit allocation 202, the 52-tone resource until allocation 204, and the 108-tone resource unit allocation 206. Each of the resource units in FIG. 2 is illustrated by a different "hatching" pattern and be assigned to particular user or station.

As the size of the resource unit allocations increase, e.g. the number of tones in a resource unit increases, the less resource units are available to assign to stations. Thus, as illustrated in the FIG. 2, the OFDMA tone allocation scheme 200 can include eight 26-tone resource units and one 26-tone resource unit at the DC tones 214 in the 26-tone resource unit allocation 202 illustrated by eight different blocks and one block straddling DC. The OFDMA tone allocation scheme 200 may also include four 52-tone resource units and one 26-tone resource unit at the DC tones 214 in the 52-tone resource unit allocation 204 illustrated by four different blocks and one block straddling DC. The OFDMA tone allocation scheme 200 may also include two 108-tone resource units and one 26-tone resource unit at the DC tones 214 in the 108-tone resource unit allocation 206 illustrated by two different blocks and one block straddling DC. Further, the OFDMA tone allocation scheme 200 may include a single non-OFDMA (single user or multi-user MIMO) 242-tone resource unit.

As mentioned, each of the tone resource unit allocations may include a number of guard or edge tones 218, null tones 216, and pilot tones (not shown). In embodiments, a number of guard or edge tones 218 may be allocated on ends of the bandwidth to prevent interference. In one example, one side of the bandwidth may be allocated five edge tones 218 and the other side may be allocated six edge tones 218, or vice versa. FIG. 2 illustrates the OFDMA tone allocation scheme 200 having null tones 216 between resource units in the 26-tone resource unit allocation 202 and the 52-tone resource unit allocation 204 in FIG. 2. The pilot tones may have variable locations and are part of the usable resource allocated tones. Further, the number of leftover tones may also be variable and based on various characteristics.

The tone resource unit allocations are defined such that they support 256-QAM modulation and coding, a 5/6 coding rate, and use BCC encoding. In one example configuration, the 108-tone resource unit allocation 208 may include two 108-tone resource units and a 26-tone resource unit that straddles the DC tones 214. Each of the 108-tone resource units may include 102 data tones and six pilot tones to allow for 256-QAM modulation and coding, a 5/6 coding rate, and use BCC encoding. Further this example configuration allows for reuse of existing legacy block interleaver architectures. Various embodiments are not limited in this manner.

Figure 3A:
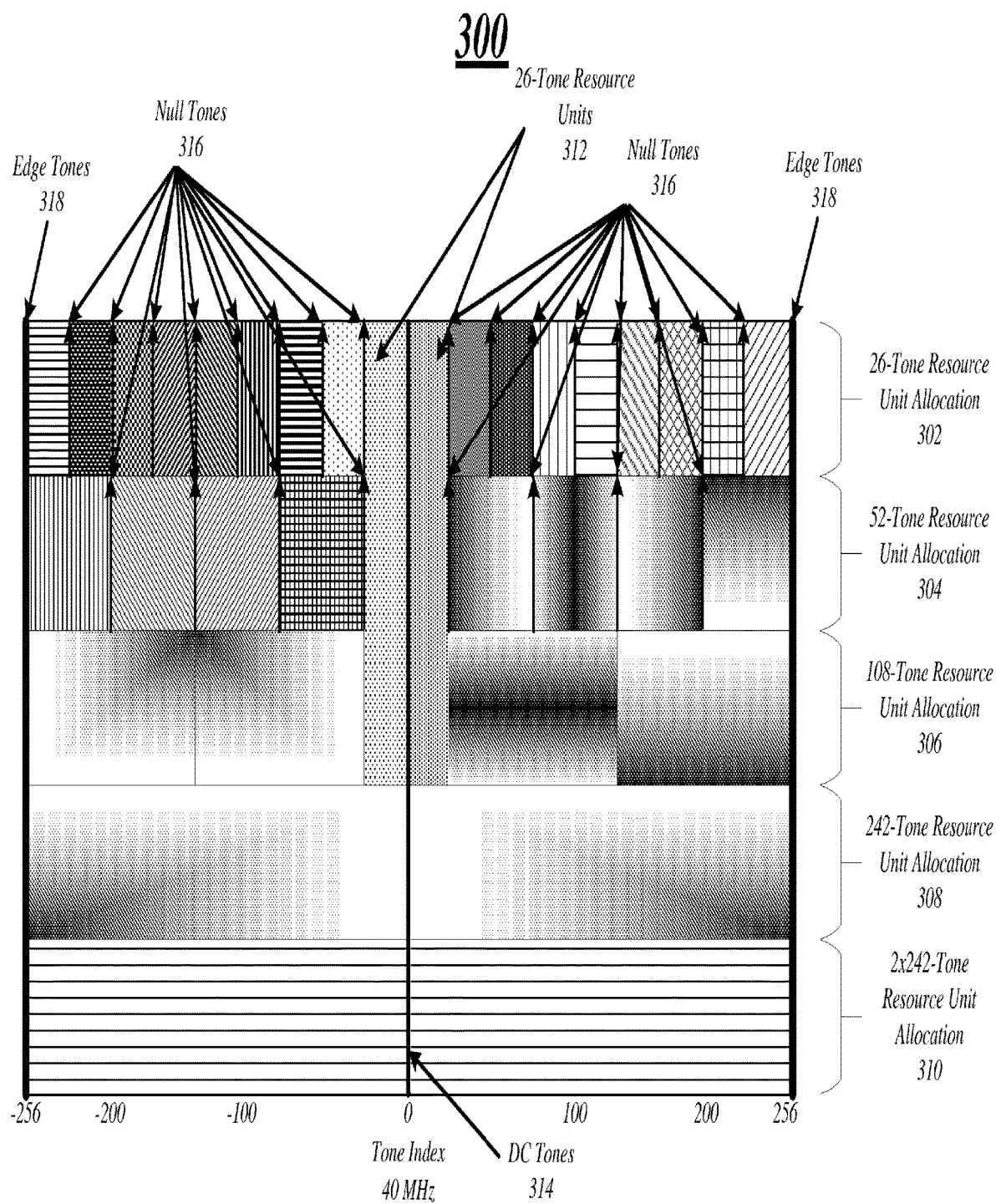
FIG. 3A illustrates an example embodiment of a second OFDMA tone allocation scheme.

FIG. 3A illustrates an example embodiment of an OFDMA tone allocation scheme 300 which may be used in communicating information between stations. In the illustrated embodiment, the OFDMA tone allocation scheme 300 has a bandwidth of 40 MHz which may be in the 2.4 GHz or the 5 GHz frequency band. In embodiments, the OFDMA tone allocation scheme 300 illustrates 512 tones from −256 on the left side of DC tones 314 to 256 on the right side of DC tones 314. In other words, the FFT size for a 40 MHz bandwidth OFDMA tone allocation scheme may be 512, which may include 5 DC tones 314, 23 edge or guard tones 318, and 484 usable tones which may include pilot tones. The OFDMA tone allocation scheme for a 40 MHz bandwidth may also include a number of null tones 316, such as 16 null tones in the 26-tone resource unit allocation 302 and 8 null tones in the 52-tone resource unit allocation 304. Embodiments are not limited in this manner.

The OFDMA tone allocation scheme 300 may divide the 40 MHz bandwidth into a number of resource units each having a plurality of tones. The number of resource units and the OFDMA tone allocation size may be based on a number of stations to communicate in the network. More specifically, the OFDMA tone allocations scheme 300 in the 40 MHz frequency range may include a 26-tone resource unit allocation 302, a 52-tone resource unit allocation 304, a 108-tone resource unit allocation 306, a 242-tone resource unit allocation 308, and a 2×242-tone resource unit allocation 310. Further, the OFDMA tone allocation scheme 300 includes two 26-tone resource units 312 that may straddle the DC tones 314 and may be within the 26-tone resource unit allocation 302, the 52-tone resource until allocation 304, and the 108-tone resource unit allocation 306. Each of the resource units in FIG. 3A is illustrated by a different "hatching" pattern and may be assigned to a user or station.

As the size of the resource unit allocations increase, e.g. the number of tones in a resource unit increases, the fewer number resource units are available to assign to stations. Thus, as illustrated in the FIG. 3A, the OFDMA tone allocation scheme 300 can include 18 26-tone resource units in the 26-tone resource unit allocation 302. The OFDMA tone allocation scheme 300 may also include eight 52-tone resource units and two 26-tone resource unit at the DC tones 314 in the 52-tone resource unit allocation 304. The OFDMA tone allocation scheme 300 may also include four 108-tone resource units and two 26-tone resource unit at the DC tones 314 in the 108-tone resource unit allocation 306. Further, the OFDMA tone allocation scheme 300 may include two 242-tone resource units in the 242-tone resource allocation 308. In some embodiments, the OFDMA tone allocations scheme 300 may include a single non-OFDMA (single user or multi-user MIMO) 2×242 (484)-tone resource unit in the 2×242-tone resource allocation 310.

As mentioned, each of the tone resource unit allocations may include a number of guard or edge tones 318, null tones 316, and pilot tones (not shown). In embodiments, a number of guard or edge tones 318 may be allocated on ends of the bandwidth to prevent interference. In one example, one side of the bandwidth may be allocated 11 edge tones 318 and the other side may be allocated 12 edge tones 318, or vice versa. FIG. 3A illustrates the OFDMA tone allocation scheme 300 illustrates null tones 316 between resource units in the 26-tone resource unit allocation 302 and the 52-tone resource unit allocation 304. The pilot tones may have variable locations and are part of the usable resource allocated tones. Further, the number of leftover tones may also be variable and based on various characteristics.

Figure 3B:
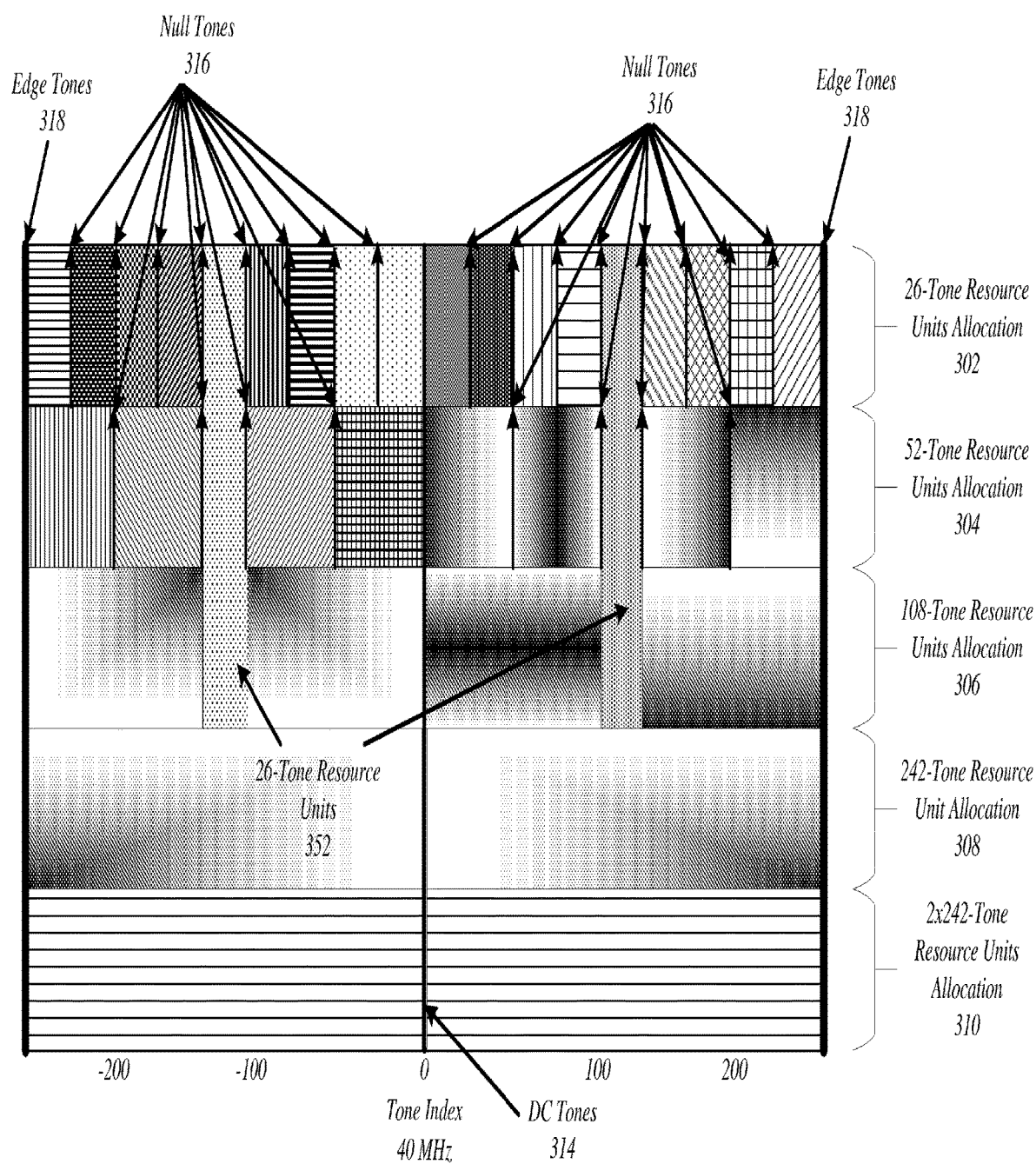
FIG. 3B illustrates an example embodiment of a third OFDMA tone allocation scheme.

FIG. 3B illustrates an example embodiment of an OFDMA tone allocation scheme 350 which may be used in communicating information between stations. In the illustrated embodiment, the OFDMA tone allocation scheme 350 has a bandwidth of 40 MHz which may be in the 2.4 GHz or the 5 GHz frequency band and may be similar to the OFDMA tone allocation scheme 300 illustrated in FIG. 3A. For example, in embodiments, the OFDMA tone allocation scheme 350 illustrates 512 tones from −256 on the left side of DC to 256 on the right side of DC. However, the OFDMA tone allocation 350 may have 26-tone resource units 352 in a middle portion of the resource units below and above the DC tones 314. The 26-tone resource units 352 may be located in the 26-tone resource unit allocation 302, the 52-tone resource unit allocation, and the 108-tone resource unit allocation.

Figure 4A:
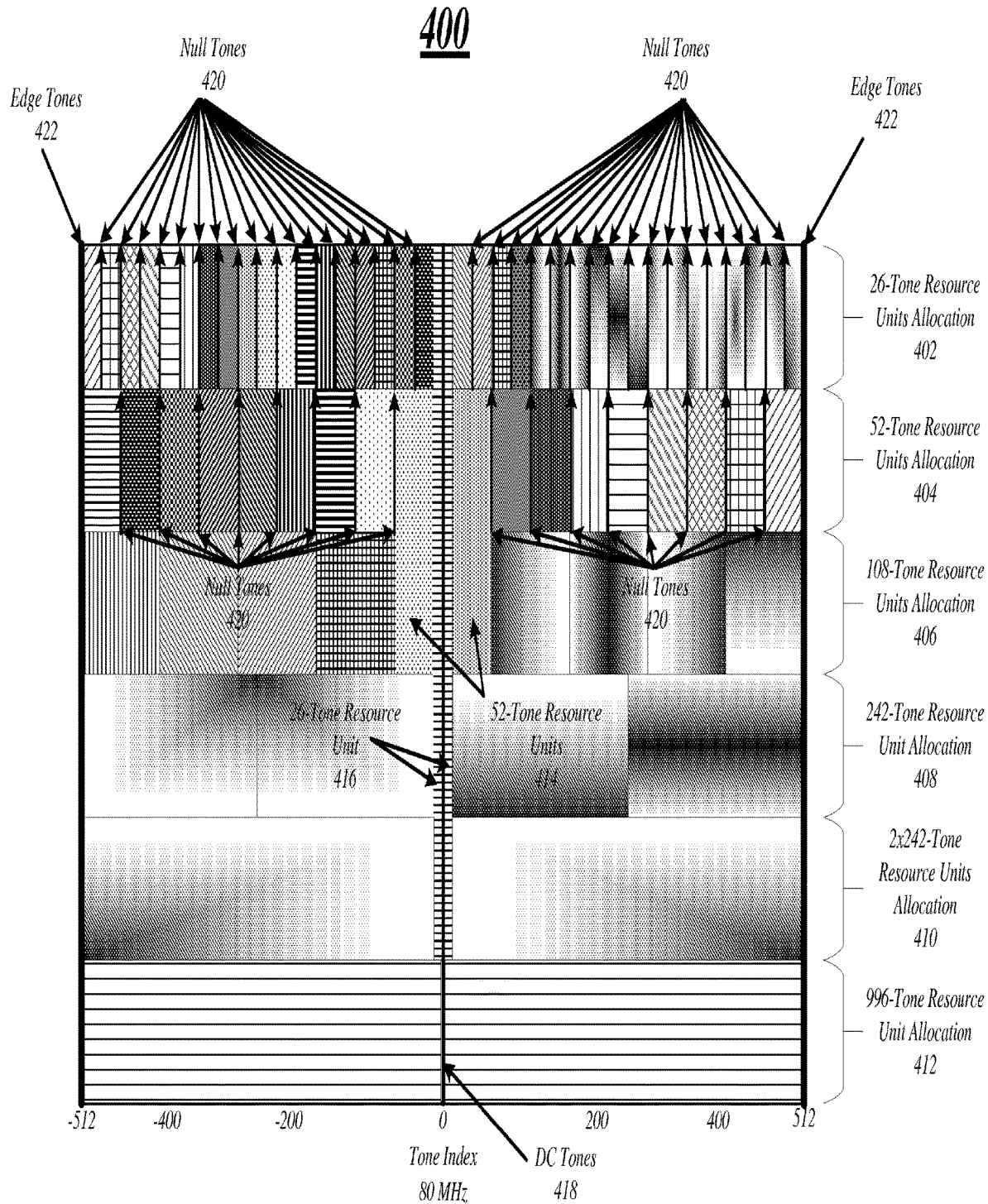
FIG. 4A illustrates an example embodiment of a fourth OFDMA tone allocation scheme.

FIG. 4A illustrates an example embodiment of an OFDMA tone allocation scheme 400 which may be used in communicating information between stations. In the illustrated embodiment, the OFDMA tone allocation scheme 400 has a bandwidth of 80 MHz which may be in the 2.4 GHz or the 5 GHz frequency band. In embodiments, the OFDMA tone allocation scheme 400 illustrates 1024 tones from −512 on the left side of DC tones 418 to 512 on the right side of DC tones 418. In other words, the FFT size for an 80 MHz bandwidth OFDMA tone allocation scheme may be 1024, which may include 7 DC tones 418, 23 edge or guard tones 422, and 994 usable tones which may include a number of pilot tones. The OFDMA tone allocation scheme for an 80 MHz bandwidth may also include a number of null tones 420, such as 32 null tones in the 26-tone resource unit allocation 402 and 16 null tones in the 52-tone resource unit allocation 404. Embodiments are not limited in this manner.

The OFDMA tone allocation scheme 400 may divide the 80 MHz bandwidth into a number of resource units each having a plurality of tones. The number of resource units and the OFDMA tone allocation size may be based on a number of stations to communicate in the network. More specifically, the OFDMA tone allocations scheme 400 in the 80 MHz frequency range may include a 26-tone resource unit allocation 402, a 52-tone resource unit allocation 404, a 108-tone resource unit allocation 406, a 242-tone resource unit allocation 408, a 2×242-tone resource unit allocation 410, and a 996-tone resource unit allocation 412. Further, the OFDMA tone allocation scheme 400 includes a single 26-tone resource unit 416 that may straddle the DC tones 418 and may be within the 26-tone resource unit allocation 402, the 52-tone resource unit allocation 404, the 108-tone resource unit allocation 406, the 242-tone resource unit allocation 408, and the 2×242-tone resource unit allocation 410. Each of the resource units in FIG. 4A is illustrated by a different "hatching" pattern and may be assigned to different users or stations.

As illustrated in the FIG. 4A, the OFDMA tone allocation scheme 400 can include 36 26-tone resource units and a single 26-tone resource unit 416 straddling DC tones 418 in the 26-tone resource unit allocation 402. The OFDMA tone allocation scheme 400 may also include 18 52-tone resource units, and a single 26-tone resource unit straddling DC tones 418 in the 52-tone resource unit allocation 404. The OFDMA tone allocation scheme 400 may also include eight 108-tone resource units, two 52-tone resource units, and a single 26-tone resource unit at the DC tones 418 in the 108-tone resource unit allocation 406. Further, the OFDMA tone allocation scheme 400 may include four 242-tone resource units and a single 26-tone resource unit in the 242-tone resource allocation 408. In some embodiments, the OFDMA tone allocation scheme 400 may include two 2×242-tone resource allocations and a single 26-resource unit allocation in the 2×242-tone resource unit allocation 410. In addition, the OFDMA tone allocation scheme 400 may include a single non-OFDMA (single user or multi-user MIMO) 996-tone resource unit in the 996-tone resource unit allocation 412.

As mentioned, each of the tone resource unit allocations may include a number of guard or edge tones 422, null tones 420, and pilot tones (not shown). In embodiments, a number of guard or edge tones 422 may be allocated on ends of the bandwidth to prevent interference. In one example, one side of the bandwidth may be allocated 11 edge tones 422 and the other side may be allocated 12 edge tones 422, or vice versa. FIG. 4A illustrates the OFDMA tone allocation scheme 400 illustrates null tones 420 between resource units in the 26-tone resource unit allocation 402 and the 52-tone resource unit allocation 404. The pilot tones may have variable locations and are part of the usable resource allocated tones. Further, the number of leftover tones may also be variable and based on various characteristics.

In the illustrated embodiment in FIG. 4A, the 52-tone resource unit allocation 404 and the 108-tone resource unit allocation 406 may include two 52-tone resource units, one on each side of the DC tones 418 and the single 26-tone resource unit 416. However, various embodiments are not limited in this manner as explained below in FIG. 4B.

Figure 4B:
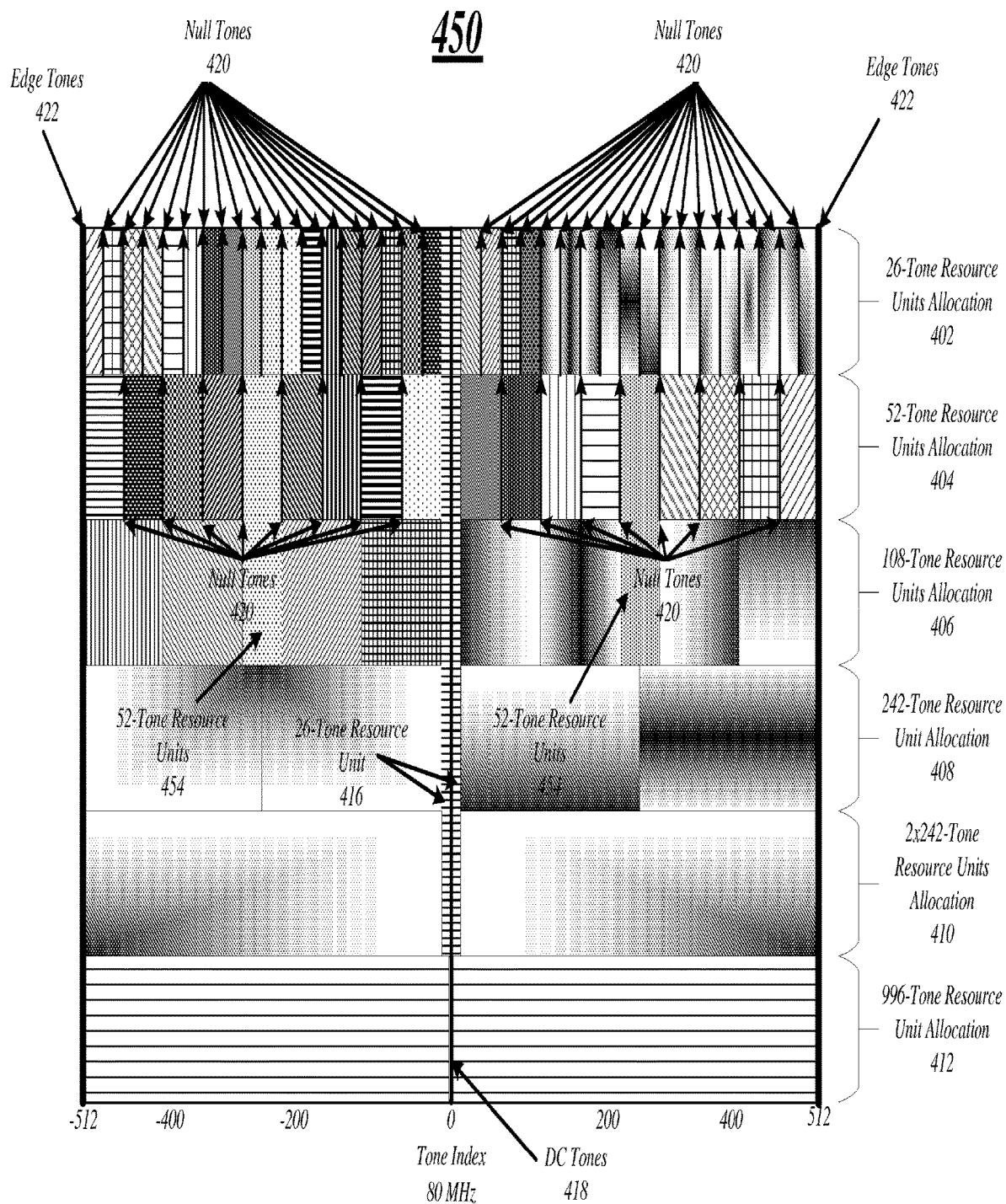
FIG. 4B illustrates an example embodiment of a fifth AFDMA tone allocation scheme.

FIG. 4B illustrates an example embodiment of an OFDMA tone allocation scheme 450 which may be used in communicating information between stations. In the illustrated embodiment, the OFDMA tone allocation scheme 450 has a bandwidth of 80 MHz which may be in the 2.4 GHz or the 5 GHz frequency band and may be similar to the OFDMA tone allocation scheme 400 illustrated in FIG. 4A. For example, in embodiments, the OFDMA tone allocation scheme 450 may illustrate 1024 tones from −512 on the left side of DC to 512 on the right side of DC. However, the OFDMA tone allocation 450 may have a single 26-tone resource unit 416 that straddles the DC tones 418 and a 52-tone resource unit in a middle portion of the resource units below the DC tones 418 and a 52-tone resource unit a middle portion to the resource units above the DC tones 418. The 52-tone resource units 454 may be within the 52-tone resource unit allocation, and the 108-tone resource unit allocation.

With respect to the OFDMA tone allocation schemes illustrated in FIGS. 2 through 4B and as previously discussed, each resource unit may be assigned to a user or a user's station by a master station. Thus, when determining which OFDMA tone allocation scheme to use the master station may need to determine a bandwidth available to communicate on in a frequency band. For example, a master station may determine available bandwidth based on traffic that is being communicated in a frequency band. The master channel may also determine how many stations desire to communicate during a same period of time, such as a HEW control period to determine which tone resource unit allocation to use. The master station may then select an OFDMA tone allocation scheme based on the bandwidth and a tone resource unit allocation to use in bandwidth based on the number of stations.

For example, 20 MHz of bandwidth may be available to communicate on for various stations. The master station may use the OFDMA tone allocation illustrated in FIG. 2 and select a tone resource unit allocation to use based on the number of stations for communication in the time period. More specifically, if eight stations wish to communicate in the time period, the 26-tone resource unit allocation 202 may be used to assign resource blocks to the stations. Various other examples may be contemplated based on available bandwidth and a number of stations to communicate in the time period.

FIG. 5 illustrates an embodiment of a first logic flow diagram 500. The logic flow 500 may be representative of some or all of the operations executed by one or more embodiments described herein. For example, the logic flow 500 may illustrate operations performed by one or more systems, devices, stations, etc. in FIGS. 1, 6 and 7 which may utilize one or more of the OFDMA tone allocation schemes disclosed in FIGS. 2 through 4B. Various embodiments are not limited in this manner.

At block 505, the logic flow 500 may include determining a bandwidth in a frequency band to communicate information to stations. In some embodiments, the bandwidth may be 20 MHz, 40 MHz, 80 MHz, and 160 (80+80) MHz and may be in the 2.4 GHz or 5 GHz frequency band. In some embodiments, the bandwidth used to communicate the information may be based on a number of stations to communicate during a time period and/or the available bandwidth in a frequency band. Other factors may also be used to determine the bandwidth to use for OFDMA communication.

In embodiments, the logic flow 500 may also include determining an OFDMA tone allocation scheme based on the bandwidth at block 510. For example, FIG. 2 illustrates an OFDMA tone allocation scheme for a 20 MHz bandwidth. Further, FIGS. 3A and 3B illustrate OFDMA tone allocation schemes for a 40 MHz bandwidth. Similarly, FIGS. 4A and 4B illustrate OFDMA tone allocation schemes for an 80 MHz bandwidth. Further, the OFDMA tone allocation scheme may include one or more resource units each comprising a plurality of tones and each resource unit having a fixed location in the bandwidth. Each of the resource units may be assigned to a user or a station for communicating information on by a master station, for example. Thus, a station may communicate on the assigned resource unit without concern of interfering with other stations also communicating during a same time period.

At block 515, the logic flow may also include communicating information to the stations based on the OFDMA tone allocation scheme. More specifically, information may be communicated to a particular station on the tones of the resource unit assigned to the particular station. For example, an access point or master station may assign a 26-tone resource unit to another station and then communicate information to the station on the tones of the assigned 26-tone resource unit.

Figure 6:
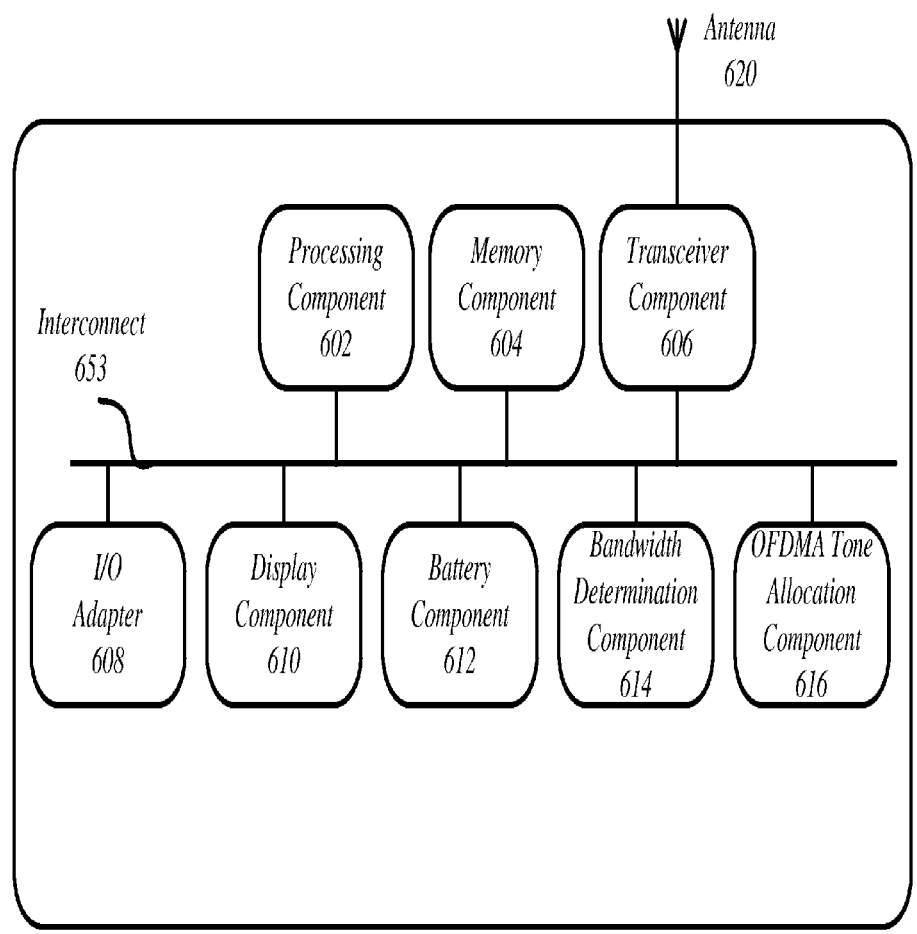
FIG. 6 illustrates an example embodiment of a computing device.

FIG. 6 illustrates an embodiment of a computing device 600. In various embodiments, computing device 600 may be representative of a computing device or system for use with one or more embodiments described herein, such as those discussed in FIGS. 1-5. Further computing device 600 may be a HEW compliant device that may be arranged to communicate with one or more other HEW devices, such as wireless stations 104 and master station 110. Further, the computing device 600 may be capable to communicate with legacy devices. In embodiments, the computing device 600 may be suitable for operating as master station or an HEW station.

In various embodiments, computing device 600 may be any type of computing device including a computing device including a personal computer (PC), laptop computer, ultra-laptop computer, netbook computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As shown in FIG. 6, computing device 600 may include multiple elements. One or more elements may be implemented using one or more circuits, components, registers, processors, software subroutine modules, or any combination thereof, as desired for a given set of design or performance constraints. Although FIG. 6 shows a limited number of elements in a certain topology by way of example, it can be appreciated that more or less elements in any suitable topology may be used in computing device 600 as desired for a given implementation. The embodiments are not limited in this context.

In various embodiments, computing device 600 may include one or more processing component(s) 602. Processing component(s) 602 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit or processing circuitry. The processing component(s) 602 may be connected to and communicate with the other elements and components of the computing system via an interconnect 643, such as one or more buses, control lines, and data lines.

In one embodiment, computing device 600 may include memory 604 which may be coupled with processing component(s) 602. In various embodiments, the memory 604 may store instructions, data and information for use by the computing device 600.

Memory 604 may be coupled to processing components(s) 602 via interconnect 653, or by a dedicated communications bus between processing components(s) 602 and memory 604, as desired for a given implementation. Memory 604 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 604 can store instructions and data momentarily, temporarily, or permanently. The memory 604 may also store temporary variables or other intermediate information while the processing component(s) 602 is executing instructions. The memory 604 is not limited to storing the above discussed data and may store any type of data.

The computing device 600 may include a transceiver 606 which includes one or more components and circuitry to transmit and receive information using radio-frequency signals. More specifically, the transceiver 606 may include circuitry to produce radio-frequency mobile radio signals which are to be sent and for processing radio-frequency mobile radio signals which have been received. To this end, the transceiver 606 may be coupled to one or more antenna 620. The transmitted or received mobile radio signals are in one or more particular frequency ranges, which are typically prescribed by the mobile radio standard(s) supported by the radio-frequency assemblies. For example, transceiver 606 may include circuitry to process information according to one or more IEEE standards, one or more peer-to-peer protocols, and so forth. Various embodiments are not limited in this manner and transceiver 606 may transmit or receive information via any standard in any frequency range with one more devices, as previously mentioned.

In various embodiments, the transceiver 606 may be used to communicate with one or more other devices or stations via one or more antennas 620. The transceiver 606 may send and receive information from the stations as one or more pockets, frames, and any other transmission structure in accordance with one or more protocols.

In some embodiments, the transceiver 606 may include physical layer (PHY) circuitry and medium-access control layer circuitry (MAC). The PHY and MAC may be HEW compliant layers and may also be compliant with one or more legacy IEEE 802.11 standards. PHY circuitry may be arranged to transmit HEW frames.

In accordance with some embodiments, the MAC circuitry may be arranged to contend for a wireless medium during a contention period to receive control of the medium for the HEW control period and configure an HEW frame. The PHY circuitry may be arranged to transmit the HEW frame as discussed above. The PHY circuitry may also be arranged to receive an HEW frame from HEW stations. MAC circuitry may also be arranged to perform transmitting and receiving operations through the PHY circuitry. The PHY circuitry may include circuitry for modulation/demodulation, up conversion and/or down conversion, filtering, amplification, etc.

The computing device 600 may include input/output adapter 608. Examples of I/O adapter 608 may include Universal Serial Bus (USB) ports/adapters, IEEE 1394 Firewire ports/adapters, and so forth. The embodiments are not limited in this context.

For example, an I/O adapter 608 may also include an input device or sensor, such as one or more buttons, a keyboard, a keypad, a touchscreen display, a touch sensitive device, a microphone, a biometric finger printer reader, biometric eye scanner or any other device used for inputting information into computing device 605. Moreover, the I/O adapter 608 may be a sensor including any hardware or logic to detect one or more touches or inputs on or near a housing of the apparatus, a display of the apparatus including a touchscreen or touch sensitive display.

In various embodiments, the I/O adapter 608 may include one or more components to output information to a user. For example, the I/O adapter 608 may include a speaker to output an audible noise or a haptic feedback device to output a vibration. The I/O adapter 608 may be located any within or on computing device 605, or may be separate and connected to the computing device 600 via a wired or wireless connection.

The computing device 600 may also include a display 610. Display 610 may constitute any display device capable of displaying information received from processor units 602, such as liquid crystal display (LCD), cathode ray tube (CRT) display, a projector, and so forth. Various embodiments are not limited in this manner.

The computing device 600 may also include storage 612. Storage 612 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 612 may include technology to increase the storage performance enhanced protection for valuable digital media when multiple hard drives are included, for example. Further examples of storage 612 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

The computing device 600 may include a bandwidth determination component 614 which may be implemented in software only, hardware only, or combination thereof. In some embodiments, the bandwidth determination component 614 may be part of a master station and may determine a bandwidth in a frequency band to communicate information to stations. In some embodiments, the bandwidth may be 20 MHz, 40 MHz, 80 MHz, and 160 (80+80) MHz and may be in the 2.4 GHz or 5 GHz frequency band. In some embodiments, the bandwidth used to communicate the information may be based on a number of stations to communicate during a time period and/or the available bandwidth in a frequency band. Other factors may also be used to determine the bandwidth to use for OFDMA communication.

The computing device 600 may include an OFDMA tone allocation component 616 which may be implemented in software only, hardware only, or combination thereof. The OFDMA tone allocation component 616 may determine an OFDMA tone allocation scheme based on a determined bandwidth. For example, FIG. 2 illustrates an OFDMA tone allocation scheme for a 20 MHz bandwidth. Further, FIGS. 3A and 3B illustrate OFDMA tone allocation schemes for a 40 MHz bandwidth. Similarly, FIGS. 4A and 4B illustrate OFDMA tone allocation schemes for an 80 MHz bandwidth.

The OFDMA tone allocation 616 may determine an OFDMA tone allocation scheme in a bandwidth, which may include allocating one or more resource units each comprising a plurality of tones to another device. Each of the resource units may be assigned to a user or a station for communicating information on by a master station, for example. Thus, a station may communicate on the assigned resource unit without concern of interfering with other stations also communicating during a same time period. The size and number of resource units assigned to a user's device may be based on a number of users wanting to communicate on the bandwidth at a same time, as previously discussed.

Figure 7:
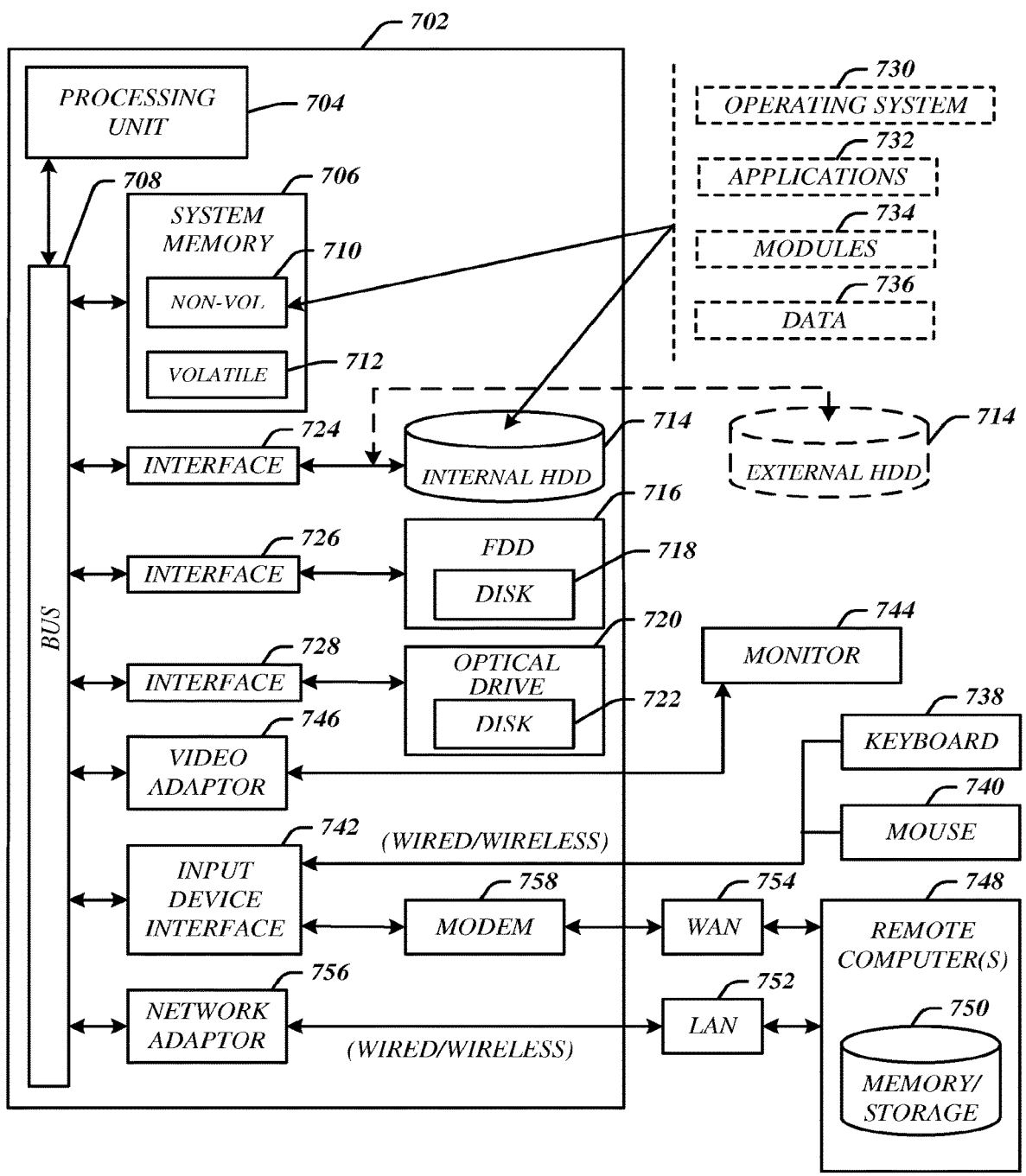
FIG. 7 illustrates an example embodiment of a computing architecture.

FIG. 7 illustrates an embodiment of an exemplary computing architecture 700 suitable for implementing various embodiments as previously described. In one embodiment, the computing architecture 700 may include or be implemented as part of system 105.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the devices in FIGS. 1-6.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 702 family of standards, such as wireless devices operatively disposed in wireless communication (e.g., IEEE 702.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 702.11x (a, b, g, n, etc.) to provide secure, reliable, fast wireless connectivity. A Wi-Fi network can be used to connect computers to each other, to the Internet, and to wire networks (which use IEEE 702.3-related media and functions).

The various elements of the system and devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, controller, or an apparatus includes a transceiver, circuitry coupled to the transceiver. The circuitry to determine a bandwidth in a frequency band to communicate information to stations, determine an Orthogonal Frequency-Division Multiple Access (OFDMA) tone allocation scheme based on the bandwidth, the OFDMA tone allocation scheme to include one or more resource units each comprising a plurality of tones and each having a fixed location in the bandwidth, and communicate, via the transceiver, information to the stations based on the OFDMA tone allocation scheme.

In a second example and in furtherance of the first example, the frequency band comprising one of a 2.4 Gigahertz (GHz) band and a 5 GHz band, and the bandwidth comprising one of 20 megahertz (MHz) frequency range, a 40 MHz frequency range, an 80 MHz frequency range, and a 160 MHz frequency range.

In a third example and in furtherance of any of the previous examples, the OFDMA tone allocation scheme to enable communicating information using at least one of a 256-Quadrature Amplitude Modulation (QAM) modulation scheme, a 5/6 code rate, and binary convolutional coding (BCC).

In a fourth example and in furtherance of any of the previous examples, the OFDMA tone allocation scheme to include one or more pilot tones, guard tones, and null tones, and the pilot tones having a variable location in the bandwidth.

In a fifth example and in furtherance of any of the previous examples, the OFDMA tone allocation scheme to include a single 26-tone resource unit straddling direct conversion (DC) tones in the bandwidth.

In a sixth example and in furtherance of any of the previous examples, the OFDMA tone allocation scheme to include resource units each having an OFDMA tone allocation size comprising one of a 26-tone size, 52-tone size, 108-tone size, 242-tone size, a 484-tone size, and a 996-tone size.

In a seventh example and in furtherance of any of the previous examples, the OFDMA tone allocation scheme in a 20 MHz bandwidth to include at least one of 26-tone resource units, 52-tone resource units, 108-tone resource units, and 242-tone resource units, and a 26-tone resource unit to straddle direct conversion (DC) tones in the 26-tone resource unit allocation, the 52-tone resource unit allocation, and the 108-tone resource unit allocation.

In an eighth example and in furtherance of any of the previous examples, the OFDMA tone allocation scheme in a 40 MHz bandwidth to include at least one of 26-tone resource units, 52-tone resource units, 108-tone resource units, 242-tone resource units, and 484-tone resource units.

In a ninth example and in furtherance of any of the previous examples, the OFDMA tone allocation scheme to include a first 26-tone resource unit located in a middle portion of tones below direct conversion (DC) tones and a second 26-tone resource unit in a second middle portion of tones above the DC tones, the first and second 26-tone resource units in the 52-tone resource unit allocation and the 108-tone resource unit allocation.

In a tenth example and in furtherance of any of the previous examples, the OFDMA tone allocation scheme to include two 26-tone resource units to straddle direct conversion (DC) tones in the 52-tone resource unit allocation, and the 108-tone resource unit allocation.

In an eleventh example and in furtherance of any of the previous examples, the OFDMA tone allocation scheme in an 80 MHz bandwidth to include at least one of 26-tone resource units, 52-tone resource units, 108-tone resource units, 242-tone resource units, 484-tone resource units, and a 996 resource unit.

In a twelfth example and in furtherance of any of the previous examples, the OFDMA tone allocation scheme in the 80 MHz bandwidth to include a 26-tone resource unit to straddle direct conversion (DC) tones in the 26-tone resource unit allocations, the 52-tone resource unit allocations, the 108-tone resource unit allocations, the 242-tone resource unit allocations, and the 484-tone resource unit allocations.

In a thirteenth example and in furtherance of any of the previous examples, the OFDMA tone allocation scheme to include a first 52-tone resource unit located in a middle portion of tones below DC tones and a second 52-tone resource unit in a second middle portion of tones above the DC tones, the first and second 52-tone resource units in the 52-tone resource unit allocations and the 108-tone resource unit allocations.

In a fourteenth example and in furtherance of any of the previous examples, the OFDMA tone allocation scheme to include a first 52-tone resource unit to a left side of the 26-tone resource unit and the DC tones and a second 52-tone resource unit to a ride side of the 26-tone resource unit and the DC tones, the first and second 52-tone resource units in the 52-tone resource unit allocations, and the 108-tone resource unit allocations.

In a fifteenth example and in furtherance of any of the previous examples, an article of manufacture comprising a storage medium containing instructions that when executed cause processing circuitry to determine a bandwidth in a frequency band to communicate information to stations, determine an Orthogonal Frequency-Division Multiple Access (OFDMA) tone allocation scheme based on the bandwidth, the OFDMA tone allocation scheme to include one or more resource units each comprising a plurality of tones and each having a fixed location in the bandwidth, and communicate information to the stations based on the OFDMA tone allocation scheme.

In a sixteenth example and in furtherance of any of the previous examples, an article of manufacture comprising a storage medium containing instructions that when executed cause processing circuitry to communicate and process information wherein the frequency band comprising one of a 2.4 Gigahertz (GHz) band and a 5 GHz band, and the bandwidth comprising one of 20 megahertz (MHz) frequency range, a 40 MHz frequency range, an 80 MHz frequency range, and a 160 MHz frequency range.

In a seventeenth example and in furtherance of any of the previous examples, an article of manufacture comprising a storage medium containing instructions that when executed cause processing circuitry to determine and communicate using the OFDMA tone allocation scheme to enable communicating information using at least one of a 256-Quadrature Amplitude Modulation (QAM) modulation scheme, a 5/6 code rate, and binary convolutional coding (BCC).

In an eighteenth example and in furtherance of any of the previous examples, an article of manufacture comprising a storage medium containing instructions that when executed cause processing circuitry to determine and communicate using the OFDMA tone allocation scheme to include one or more pilot tones, guard tones, and null tones, the pilot tones having a variable location in the bandwidth.

In a nineteenth example and in furtherance of any of the previous examples, an article of manufacture comprising a storage medium containing instructions that when executed cause processing circuitry to determine and communicate using the OFDMA tone allocation scheme to include a single 26-tone resource unit straddling direct conversion (DC) tones in the bandwidth.

In a twentieth example and in furtherance of any of the previous examples, an article of manufacture comprising a storage medium containing instructions that when executed cause processing circuitry to determine and communicate the OFDMA tone allocation scheme to include resource units each having an OFDMA tone allocation size comprising one of a 26-tone size, 52-tone size, 108-tone size, 242-tone size, a 484-tone size, and a 996-tone size.

In a twenty-first example and in furtherance of any of the previous examples, a computer-implemented may include determining, by circuitry, a bandwidth in a frequency band to communicate information to stations, determining, by the circuitry, an Orthogonal Frequency-Division Multiple Access (OFDMA) tone allocation scheme based on the bandwidth, the OFDMA tone allocation scheme to include one or more resource units each comprising a plurality of tones and each having a fixed location in the bandwidth, communicating, by the circuitry, information to the stations based on the OFDMA tone allocation scheme.

In a twenty-second example and in furtherance of any of the previous examples, the computer implemented method may include the frequency band comprising one of a 2.4 Gigahertz (GHz) band and a 5 GHz band, and the bandwidth comprising one of 20 megahertz (MHz) frequency range, a 40 MHz frequency range, an 80 MHz frequency range, and a 160 MHz frequency range.

In a twenty-third example and in furtherance of any of the previous examples, the computer implemented method may include the OFDMA tone allocation scheme to enable communicating information using at least one of a 256-Quadrature Amplitude Modulation (QAM) modulation scheme, a 5/6 code rate, and binary convolutional coding (BCC).

In a twenty-fourth example and in furtherance of any of the previous examples, the computer implemented method may include the OFDMA tone allocation scheme to include one or more pilot tones, guard tones, and null tones, and the pilot tones having a variable location in the bandwidth.

In a twenty-fifth example and in furtherance of any of the previous examples, the computer implemented method may include the OFDMA tone allocation scheme to include resource units each having an OFDMA tone allocation size comprising one of a 26-tone size, 52-tone size, 108-tone size, 242-tone size, a 484-tone size, and a 996-tone size.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   bandwidth determination circuitry to determine a bandwidth in a frequency band to communicate information to stations;
   Orthogonal Frequency-Divisional Multiple Access (OFDMA) tone allocation circuitry to select a first OFDMA tone allocation scheme based on the bandwidth being 40 Megahertz (MHz), the first OFDMA tone allocation scheme to include a first 26-tone resource unit located in a middle portion of tones below direct conversion (DC) tones and a second 26-tone resource unit in a second middle portion of tones above the DC tones, the first and second 26-tone resource units at least in a 26-tone resource unit allocation set and a 52-tone resource unit allocation set; and
   circuitry to cause communication of information to the stations based on the first OFDMA tone allocation scheme.

2. The apparatus of claim 1, the first OFDMA tone allocation scheme to include twelve guards located on a first end of tones below the DC tones and eleven guards located on a second end of tones above the DC tones for each of a 26-tone resource unit allocation set, a 52-tone resource unit allocation set, a 242-tone resource unit allocation set, and a 484-tone resource unit allocation set.

3. The apparatus of claim 1, the first OFDMA tone allocation to include null tones on each side of the first 26-tone resource unit and each side of the second 26-tone resource unit.

4. The apparatus of claim 1, the OFDMA tone allocation circuitry to select a second OFDMA tone allocation scheme based on the bandwidth being 20 MHz, the second OFDMA tone allocation scheme to include a 26-tone resource unit allocation set, a 52-tone resource unit allocation set, and a 242-tone resource unit allocation set, and a single 26-tone resource unit straddling direct conversion (DC) tones in the bandwidth; and
   the circuitry to cause communication of information to the stations based on the second OFDMA tone allocation scheme.

5. The apparatus of claim 4, the second OFDMA tone allocation scheme to include the 26-tone resource unit to straddle direct conversion (DC) tones in the 26-tone resource unit allocation set and the 52-tone resource unit allocation set.

6. The apparatus of claim 4, the second OFDMA tone allocation scheme to include six guards located on a first end of tones below the DC tones and five guards located on a second end of tones above the DC tones for each of a 26-tone resource unit allocation set, a 52-tone resource unit allocation set, and a 242-tone resource unit allocation set.

7. The apparatus of claim 4, the second OFDMA tone allocation scheme to include null tones in a first middle portion of tones below the DC tones and a second middle portion of tones above the DC tones.

8. The apparatus of claim 1, the OFDMA tone allocation circuitry to select a third OFDMA tone allocation scheme based on the bandwidth being 80 MHz, the third OFDMA tone allocation scheme to include a 26-tone resource unit allocation set, a 52-tone resource unit allocation set, a 242-tone resource unit allocation set, a 484-tone resource unit allocation set, and a 996-resource unit allocation set, and a single 26-tone resource unit straddling direct conversion (DC) tones in the bandwidth; and
   the circuitry to cause communication of information to the stations based on the third OFDMA tone allocation scheme.

9. The apparatus of claim 8, the third OFDMA tone allocation scheme to include the 26-tone resource unit to straddle direct conversion (DC) tones in the 26-tone resource unit allocation set, the 52-tone resource unit allocation set, the 242-tone resource unit allocation set, and the 484-tone resource unit allocation set.

10. The apparatus of claim 8, the third OFDMA tone allocation scheme to include twelve guards located on a first end of tones below the DC tones and eleven guards located on a second end of tones above the DC tones for each of a 26-tone resource unit allocation set, a 52-tone resource unit allocation set, a 242-tone resource unit allocation set, a 484-tone resource unit allocation set, and a 996-tone resource unit allocation set.

11. The apparatus of claim 1, comprising:
    a transceiver coupled with an antenna to communication the information, and wherein the frequency band comprising one of a 2.4 Gigahertz (GHz) band and a 5 GHz band, and the bandwidth comprising one of 20 megahertz (MHz) frequency range, a 40 MHz frequency range, and an 80 MHz frequency range.

12. At least one non-transitory storage medium containing instructions that when executed cause processing circuitry to:
    determine a bandwidth in a frequency band to communicate information to stations;
    select a first OFDMA tone allocation scheme based on the bandwidth being 40 Megahertz (MHz), the first OFDMA tone allocation scheme to include a first 26-tone resource unit located in a middle portion of tones below direct conversion (DC) tones and a second 26-tone resource unit in a second middle portion of tones above the DC tones, the first and second 26-tone resource units at least in a 26-tone resource unit allocation set and a 52-tone resource unit allocation set; and
    cause communication of information to the stations based on the first OFDMA tone allocation scheme.

13. The at least one non-transitory storage medium of claim 12, the first OFDMA tone allocation scheme to include twelve guards located on a first end of tones below the DC tones and eleven guards located on a second end of tones above the DC tones for each of a 26-tone resource unit allocation set, a 52-tone resource unit allocation set, a 242-tone resource unit allocation set, and a 484-tone resource unit allocation set.

14. The at least one non-transitory storage medium of claim 12, the first OFDMA tone allocation to include null tones on each side of the first 26-tone resource unit and each side of the second 26-tone resource unit.

15. The at least one non-transitory storage medium of claim 12 containing instructions that when executed cause processing circuitry to:
select a second OFDMA tone allocation scheme based on the bandwidth being 20 MHz, the second OFDMA tone allocation scheme to include a 26-tone resource unit allocation set, a 52-tone resource unit allocation set, and a 242-tone resource unit allocation set, and a single 26-tone resource unit straddling direct conversion (DC) tones in the bandwidth; and
cause communication of information to the stations based on the second OFDMA tone allocation scheme.

16. The at least one non-transitory storage medium of claim 15, the second OFDMA tone allocation scheme to include the 26-tone resource unit to straddle direct conversion (DC) tones in the 26-tone resource unit allocation set and the 52-tone resource unit allocation set.

17. The at least one non-transitory storage medium of claim 15, the second OFDMA tone allocation scheme to include six guards located on a first end of tones below the DC tones and five guards located on a second end of tones above the DC tones for each of a 26-tone resource unit allocation set, a 52-tone resource unit allocation set, and a 242-tone resource unit allocation set.

18. The at least one non-transitory storage medium of claim 15, the second OFDMA tone allocation scheme to include null tones in a first middle portion of tones below the DC tones and a second middle portion of tones above the DC tones.

19. The at least one non-transitory storage medium of claim 12 containing instructions that when executed cause processing circuitry to:
select third OFDMA tone allocation scheme based on the bandwidth being 80 MHz, the third OFDMA tone allocation scheme to include a 26-tone resource unit allocation set, a 52-tone resource unit allocation set, a 242-tone resource unit allocation set, a 484-tone resource unit allocation set, and a 996-resource unit allocation set, and a single 26-tone resource unit straddling direct conversion (DC) tones in the bandwidth; and
cause communication of information to the stations based on the third OFDMA tone allocation scheme.

20. The at least one non-transitory storage medium of claim 19, the third OFDMA tone allocation scheme to include the 26-tone resource unit to straddle direct conversion (DC) tones in the 26-tone resource unit allocation set, the 52-tone resource unit allocation set, the 242-tone resource unit allocation set, and the 484-tone resource unit allocation set.

21. The at least one non-transitory storage medium of claim 19, the third OFDMA tone allocation scheme to include twelve guards located on a first end of tones below the DC tones and eleven guards located on a second end of tones above the DC tones for each of a 26-tone resource unit allocation set, a 52-tone resource unit allocation set, a 242-tone resource unit allocation set, a 484-tone resource unit allocation set, and a 996-tone resource unit allocation set.

22. A computer-implemented method, comprising:
determining a bandwidth in a frequency band to communicate information to stations;
selecting a first OFDMA tone allocation scheme based on the bandwidth being 40 Megahertz (MHz), the first OFDMA tone allocation scheme to include a first 26-tone resource unit located in a middle portion of tones below direct conversion (DC) tones and a second 26-tone resource unit in a second middle portion of tones above the DC tones, the first and second 26-tone resource units at least in a 26-tone resource unit allocation set and a 52-tone resource unit allocation set; and
causing communication of information to the stations based on the first OFDMA tone allocation scheme.

23. The computer-implemented method of claim 22, the first OFDMA tone allocation scheme to include twelve guards located on a first end of tones below the DC tones and eleven guards located on a second end of tones above the DC tones for each of a 26-tone resource unit allocation set, a 52-tone resource unit allocation set, a 242-tone resource unit allocation set, and a 484-tone resource unit allocation set.

24. The computer-implemented method of claim 22, the first OFDMA tone allocation to include null tones on each side of the first 26-tone resource unit and each side of the second 26-tone resource unit.

25. The computer-implemented method of claim 22, comprising:
selecting a second OFDMA tone allocation scheme based on the bandwidth being 20 MHz, the second OFDMA tone allocation scheme to include a 26-tone resource unit allocation set, a 52-tone resource unit allocation set, and a 242-tone resource unit allocation set, and a single 26-tone resource unit straddling direct conversion (DC) tones in the bandwidth; and
causing communication of information to the stations based on the second OFDMA tone allocation scheme.

26. The computer-implemented method of claim 25, the second OFDMA tone allocation scheme to include the 26-tone resource unit to straddle direct conversion (DC) tones in the 26-tone resource unit allocation set and the 52-tone resource unit allocation set.

27. The computer-implemented method of claim 25, the second OFDMA tone allocation scheme to include six guards located on a first end of tones below the DC tones and five guards located on a second end of tones above the DC tones for each of a 26-tone resource unit allocation set, a 52-tone resource unit allocation set, and a 242-tone resource unit allocation set.

28. The computer-implemented method of claim 25, the second OFDMA tone allocation scheme to include null tones in a first middle portion of tones below the DC tones and a second middle portion of tones above the DC tones.

29. The computer-implemented method of claim 22, comprising:
selecting third OFDMA tone allocation scheme based on the bandwidth being 80 MHz, the third OFDMA tone allocation scheme to include a 26-tone resource unit allocation set, a 52-tone resource unit allocation set, a 242-tone resource unit allocation set, a 484-tone resource unit allocation set, and a 996-resource unit allocation set, and a single 26-tone resource unit straddling direct conversion (DC) tones in the bandwidth; and
causing communication of information to the stations based on the third OFDMA tone allocation scheme.

30. The computer-implemented method of claim 29, the third OFDMA tone allocation scheme to include the 26-tone resource unit to straddle direct conversion (DC) tones in the 26-tone resource unit allocation set, the 52-tone resource unit allocation set, the 242-tone resource unit allocation set, and the 484-tone resource unit allocation set.

31. The computer-implemented method of claim 29, the third OFDMA tone allocation scheme to include twelve guards located on a first end of tones below the DC tones and eleven guards located on a second end of tones above the DC tones for each of a 26-tone resource unit allocation set, a 52-tone resource unit allocation set, a 242-tone resource unit allocation set, a 484-tone resource unit allocation set, and a 996-tone resource unit allocation set.

* * * * *